United States Patent [19]

Reed, Jr.

[11] Patent Number: 4,726,250

[45] Date of Patent: Feb. 23, 1988

[54] SHIFT RAIL LOCK-OUT MECHANISM

[75] Inventor: Richard G. Reed, Jr., Dearborn, Mich.

[73] Assignee: Chrysler Motors Corporation, Highland Park, Mich.

[21] Appl. No.: 45,333

[22] Filed: May 4, 1987

[51] Int. Cl.$^4$ .............................................. G05G 5/10
[52] U.S. Cl. .................................................... 74/477
[58] Field of Search ............................. 74/477, 483 PB

[56] References Cited

U.S. PATENT DOCUMENTS

| 1,537,584 | 5/1925 | Carhart | 74/477 |
| 3,104,558 | 9/1963 | Herr, Jr. | 74/477 |
| 4,633,729 | 1/1987 | Scalisi et al. | 74/477 |
| 4,633,730 | 1/1987 | Scalisi et al. | 74/477 |

Primary Examiner—Allan D. Herrmann

Attorney, Agent, or Firm—Edward P. Barthel

[57] ABSTRACT

A shift rail lock-out mechanism for a manual transmission having left and right pairs of shift rails arranged in a symmetrical manner about a medial plane. A lock-out frame member defines a rectangular-shaped opening through which said pairs of rails extend for individual reciprocal travel therein. A pair of left and right shuttle blocks are supported in the frame member opening such that each shuttle block is captured between its associated pair of rails and adapted to slide relative thereto. The frame member includes left and right internal locking edges while each shuttle block has inner and outer locking edges. The locking edges cooperate with opposed camming recesses in the rails for concurrent transverse movement to insure travel of only one rail at a time during the shifting operation.

3 Claims, 10 Drawing Figures

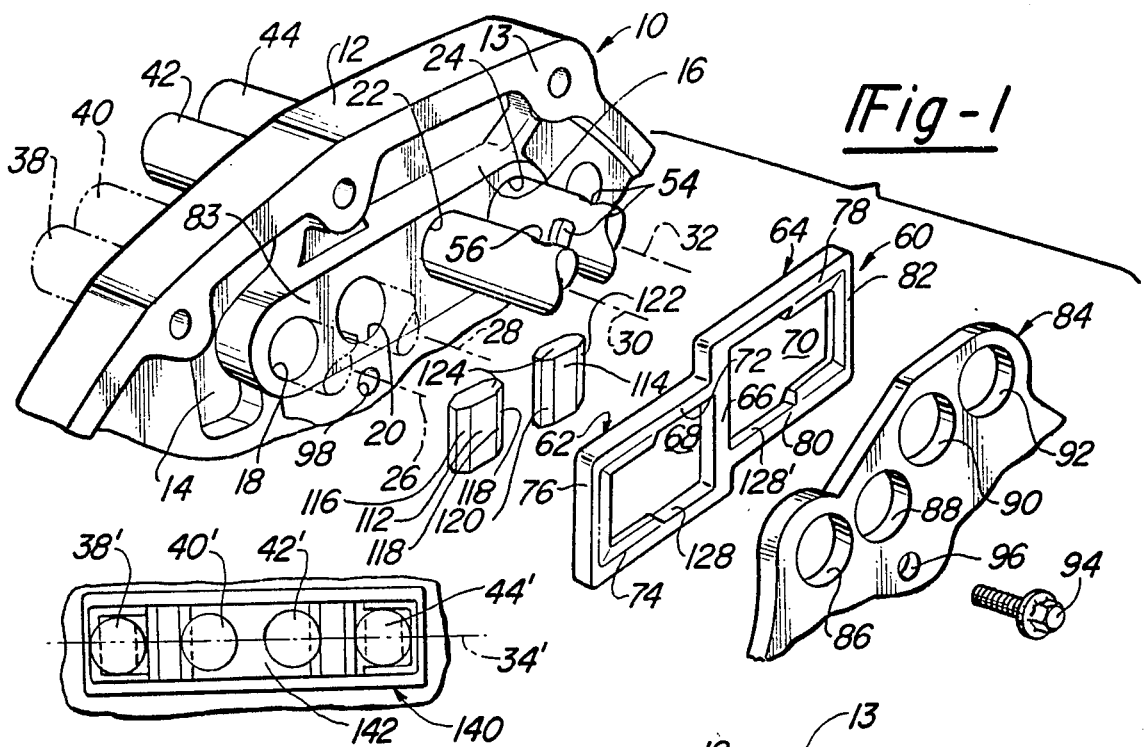
Fig-1
Fig-9
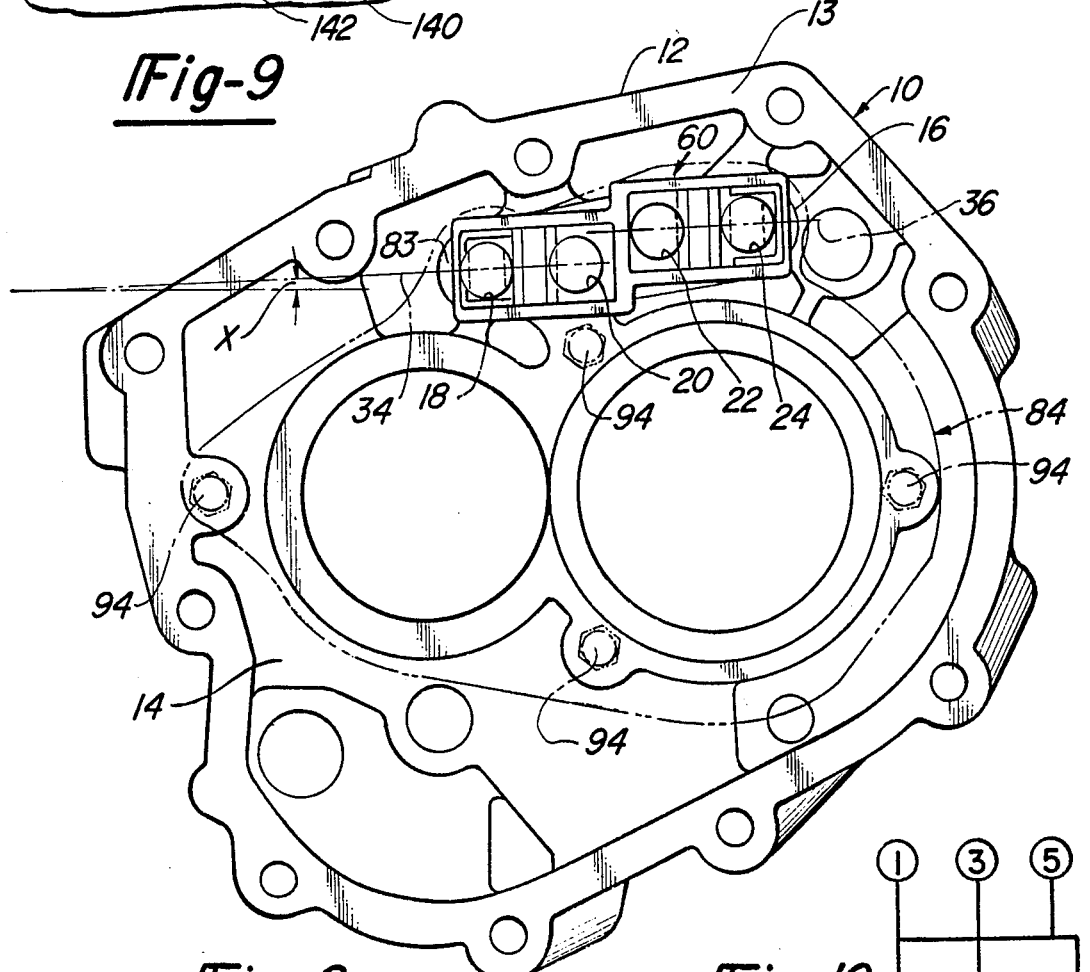
Fig-2
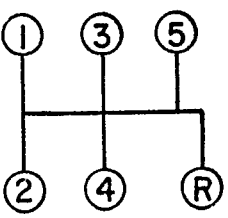
Fig-10

SHIFT RAIL LOCK-OUT MECHANISM

BACKGROUND OF THE INVENTION

This invention relates to manually operable change speed transmissions for motor vehicles and more particularly to a novel lock-out mechanism for a four shift rail manual transmission.

In vehicles having manual change speed transmission, wherein gears are shiftable by axially reciprocable shift rails, there is a need to prevent the shiftable gears from being accidently moved out of their preselected positions. Examples of prior art plate-like dual lug interlocking devices may be found in U.S. Pat. Nos. 4,633,729 and 4,633,730 issued Jan. 6, 1987 and assigned to the same assignee as the instant invention. While the interlocking dual lug arrangements of these patents are suitable for three shift rail transmissions they are not applicable to four shift rail transmissions. Further, in the above patent the dual lugs must either be interlocked between the three rails or supported on a horizontally disposed shoulder or the like.

Still other examples of three shift rail locking arrangements are disclosed in the U.S. Pat. Nos. 3,104,558 issued Sept. 24, 1963 and 1,537,584 issued May 12, 1925.

SUMMARY OF THE INVENTION

Accordingly, it is a general object of the present invention to provide an improved, compact, efficient and economical lock-out mechanism for a shift rail manual transmission.

Another object of the invention is to provide an improved lock-out mechanism for a four shift rail manual transmission wherein the lock-out mechanism is supported on two or more of the shift rails for transverse sliding movement relative thereto in slot means defining parallel vertically disposed spaced surfaces.

A further object of the invention is to provide an improved lock-out arrangement comprising a frame member defining a generally rectangular shaped opening through which extend left and right pairs of axially movable mirror image shift rails. The frame member opening is defined by upper and lower horizontally disposed bar portions joined by left and right vertically disposed bar portions wherein the upper bar portions interior are adapted to slidably rest on two or more of the rails. Each outboard rail is formed with a pair of opposed recesses while each inboard rail is formed with an outwardly facing recess. The recesses are adapted to lie in a common transverse plane which includes the frame member with the rails positioned in their neutral mode.

A pair of left and right shuttle blocks are supported in the frame member opening with each shuttle block defining inner and outer vertically disposed interlocking beveled edges. The left and right shuttle blocks are located between their respective left and right pair of rails and are adapted for sliding movement in the frame opening relative to the rails. The rails are spaced such that with one shuttle block vertical beveled edge in locking engagement with one opposed rail recess, its other vertical beveled edge just clears its other opposed rail recess. The frame member left and right bar portions are each formed with an internal beveled locking edge arranged such that, for example, with its left internal beveled edge in locking engagement with its opposed rail recess its right internal beveled edge just clears its opposed rail recess.

The frame member upper and lower bar portions are formed with upper and lower left and right pairs of symmetrically disposed stop shoulders. Each pair of stop shoulders is adapted to contact its associated shuttle block outer beveled edge. The stop shoulders function to slidably position the shuttle blocks in conjunction with the reciprocal movement of the frame member in a predetermined manner.

As an example of the lock-out mechanism operation, assume the operator desires to shift the left outboard or reverse gear rail from its neutral mode wherein the reverse rail outwardly facing recess is initially interlocked with the frame member left internal beveled edge. Also, the left shuttle block inner beveled edge is initially interlocked with the outwardly facing recess of the left inboard or fifth speed rail while the left shuttle block outer beveled edge engages the left pair of stop shoulders. Upon the reverse rail being shifted its outwardly facing recess cams the frame member leftwardly a predetermined distance wherein its left interior beveled edge is unlocked from the reverse rail. At the same time the frame member's right interior beveled edge is moved leftward into locking engagement with the right outboard or first/second speed gear rail. The leftward movement of the frame member also causes its right pair of stop shoulders to slide the right shuttle block out of locking engagement with the first/second speed gear rail opposed recess. This, in turn, causes the right shuttle block inner beveled edge to be moved into locking engagement with the right inboard or third/four speed gear rail opposed recess. The reverse rail is thus free for axial travel so as to engage the reverse gear while the remaining three rails are locked-out by the mechanism. The same sequence of events occurs in a converse manner upon the operator desiring to shift the right outboard or first/second speed gear rail as the mechanism is symmetrical about a longitudinally extending vertical disposed medial plane located intermediate the two inboard rails.

BRIEF DESCRIPTION OF THE DRAWINGS

These and other features and advantages of this invention will become readily apparent from a reading of the following description in conjunction with the detailed drawings wherein:

FIG. 1 is an exploded fragmentary view of the shift rails and interlocking mechanism of the present invention;

FIG. 2 is a vertical elevational view of a transmission bearing plate showing the location of the interlocking mechanism;

FIG. 9 is a fragmentary elevational view showing a modified arrangement of the instant invention; and FIG. 10 is a diagram of a shift pattern of a transmission incorporating the instant invention.

DESCRIPTION OF THE PREFERRED EMBODIMENT

With reference to the drawings, FIG. 2 shows a vertically extending midship bearing wall or plate, generally indicated at 10, designed to be supported at the juncture of forward and aft transmission case portions (not shown). Reference may be made to the above-mentioned U.S. Pat. No. 4,633,739 the disclosure of which is incorporated by reference herein. The '729 patent shows a typical manual transmission case with a midship bearing plate supported between forward and aft case portions.

Figure 4:
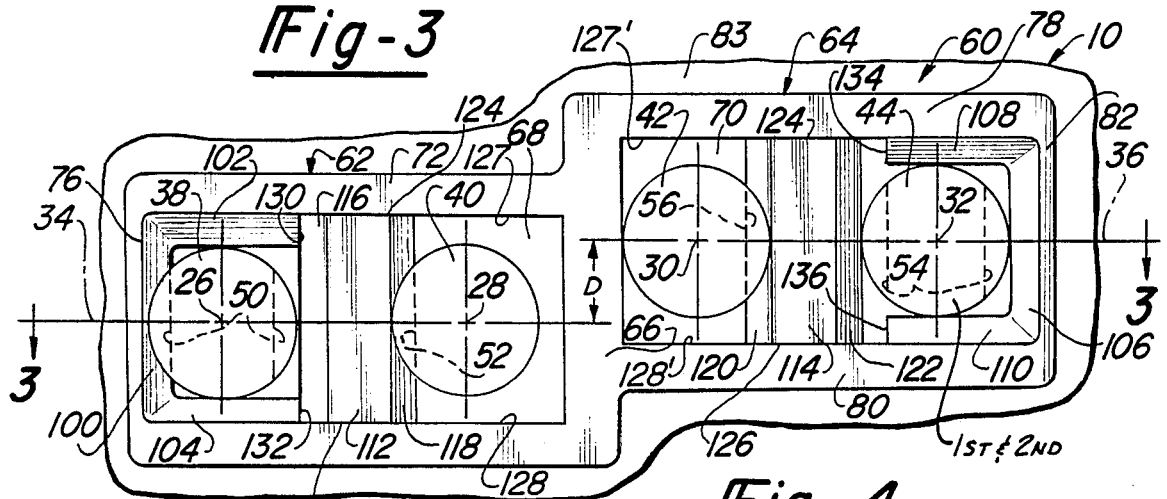
FIG. 4 is an enlarged fragmentary elevational view of the interlocking mechanism portion of FIG. 2.
Figures 5, 6:
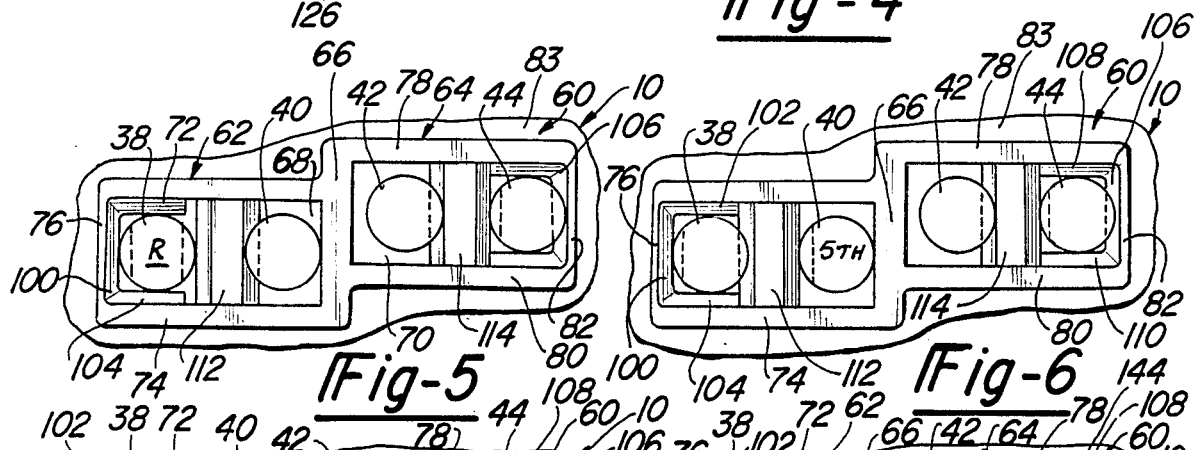
FIGS. 5, 6, 7 and 8 are views similar to FIG. 4 showing the interlocking mechanism in its four modes.

As best seen in FIG. 1 the bearing plate 10 includes a thickened peripheral frame portion 12 having a mating face 13, and formed integral with a connecting interior web portion 14. The web portion is designed with various shaped intermediate raised support areas including an elongated oval-shaped raised area 16 defining a planar wall surface. The oval-shaped raised area 16 is formed with first and second pairs of longitudinally extending through bores 18, 20 and 22, 24 respectively. The first pair of bores 18 and 20 have their principal axes 26 and 28, respectively, spaced a predetermined distance equal to the spacing between axes 30 and 32 of the second pair of bores 18 and 20, respectively. As best seen in FIG. 4 the axes 26 and 28 define a first plane 34 which is parallel to and downwardly offset a distance "D" from a second plane 36 that includes the second pair of axes 30 and 32.

It will be noted in FIG. 2 that the parallel planes 34 and 36 are oriented so as to be inclined upwardly to the right from the horizontal at a slight acute angle "X". For the purposes of description the planes 34 and 36 are shown in FIGS. 4–8 as being exactly horizontal. However, it will be evident from the following description that the parallel planes 34 and 36 could be oriented at any angle "X" without interfering with the operation of the lock-out mechanism.

FIGS. 1 and 4 show a first or left pair of parallel, relatively movable, shift rails 38 and 40 slidably supported in the first pair of left and right bores 18 and 20, respectively. A second or right pair of parallel, relatively movable shift rails 42 and 44 are supported in the second pair of left and right bores 22 and 24, respectively. Each of the shift rails 38, 40, 42 and 44 may have pinned thereon shift means such as shifter forks, for example, (not shown) disclosed in the above mentioned '729 patent.

In the instant invention the outboard shift rail 38 of the left pair of rails has a rearward or reverse shift fork engaged with a reverse gear clutching device. The inboard shift rail 40 of the left pair of rails has a forward shift fork engaged with a fifth speed gear clutching device. Such clutching devices (not shown) may be sliding clutch synchronizers as shown in the '729 patent, for example.

The inboard shift rail 42 of the right pair of rails has a forward fork engaged with a third speed gear clutching device and a rearward fork engaged with a fourth speed gear clutching device providing a third/fourth speed gear rail. Finally, the outboard shift rail 44 of the right pair of rails has a forward fork engaged with a first speed gear clutching device and a rearward fork engaged with a second speed gear clutching device providing a first/second speed gear rail.

Figure 3:
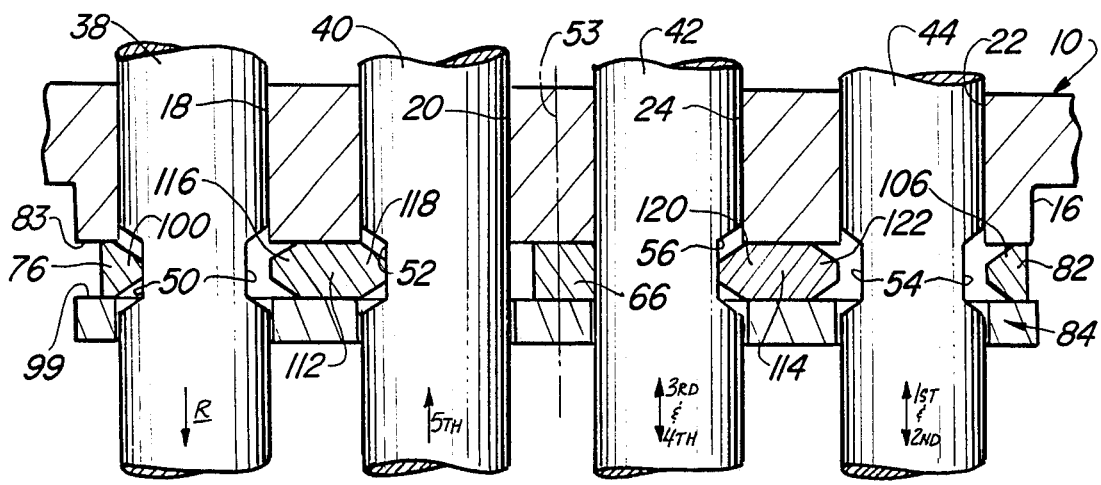
FIG. 3 is an enlarged fragmentary sectional view, taken substantially on the line 3—3 of FIG. 4.

With reference to FIGS. 1 and 3, the outboard rail 38 of the left pair of rails has a pair of outwardly and inwardly facing opposed shallow V-shaped cam notches or recesses 50 formed therein. The inboard rail 40 of the left pair of rails has a single V-shaped outwardly facing cam recess 52 formed therein. It will be observed that the two pairs of rails 38, 40 and 42, 44 are in symmetrical mirror image relation about a vertical plane, indicated by construction line 53 in FIG. 3. Thus, the outboard rail 44 of the right pair of rails has a pair of outwardly and inwardly facing opposed V-shaped recesses 54 formed therein while the right inboard rail 42 has a single V-shaped recess 56 formed therein facing outwardly.

As best seen in FIGS. 1 and 4 a shift rail lock-out mechanism, generally indicated at 60, comprises a frame member in the form of first and second or left and right generally rectangular-shaped offset frames shown at 62 and 64, respectively. The dual frames 62 and 64 are interconnected by an intermediate vertically disposed, rectangular sectioned column 66 common to both the left and right frames 62 and 64. The left 62 and right 64 frames each define a left and right rectangular shaped transversely extending opening 68 and 70, respectively.

The left opening 68 is defined by horizontal upper 72 and lower 74 bar portions, respectively, interconnected by vertical outboard or left bar portion 76 and the column portion 66. The second slotted opening 70 is defined by horizontal upper 78 and lower 80 bar portions, respectively, interconnected by vertical outboard or right bar portion 82 and the column portion 66.

With reference to FIGS. 1 and 3 it will be seen that the rail lock-out mechanism 60 is mounted on the midship bearing wall 10 such that the left pair of rails 38 and 40 extend through the left rectangular opening 68 and the right pair of rails 42 and 44 extend through the right opening 70. The frame member 62, 64 is retained in a flush juxtaposed manner on planar face 83 of the oval-shaped area 16 by means of a steel back-up or cover plate 84 having two pair of offset holes 86, 88 and 90, 92 extending therethrough. The cover plate holes are sized and arranged to receive respective ones of the left and right pair of shift rails 38, 40 and 42, 44 therein. The cover plate 84 is fixedly secured to the midship bearing plate 10 such as by threaded machine bolts shown at 94, extending through their aligned cover plate holes 96 for threaded reception in bearing wall bores one of which is indicated at 98 in FIG. 1.

It will be noted that the oval area face 83 is recessed inwardly from the plane of the frame mating face 13 a predetermined distance. Thus, upon tightening the bolts 94 a clearance space is provided between the surface 83 and inner surface 99 (FIG. 3) of the cover plate thereby allowing the frame member 62, 64 to slide freely in a predetermined transverse direction relative to the rails, in gap means between the cover plate inner surface 99 and the planar face 93.

With reference to FIGS. 1, 4 and 9 it will be seen that the frame openings 68 and 70 each include mirror image C-shaped integral beveled internal edges having a regular trapezoid configuration in longitudinal section as best seen in FIG. 3. Thus, left opening 68 has an internal vertical beveled cam follower edge 100 and upper and lower internal beveled edges 102 and 104, respectively. In an identical mirror image manner the right frame opening 70 has an internal vertical beveled cam follower edge 106 together with upper and lower internal beveled edges 108 and 110, respectively.

It will be noted that the left upper and lower beveled edges 102 and 104 are vertically spaced a predetermined distance to slidably receive therebetween associated left outboard shift rail 38. In a like manner the right upper and lower beveled edges 108 and 110 are vertically spaced the same predetermined distance to slidably receive therebetween its associated outboard shift rail 44. As a result the frame member 62, 64 may be located at any angle "X" from the horizontal, including a 90 degree angle, to accommodate various shift rail patterns without hindering its lock-out function.

As depicted in FIGS. 3 and 4 each frame opening 68 and 70 slidably support an interlocking shuttle block intermediate each left and right pair of shift rails. Thus, left shuttle block 112 is located intermediate the left pair of rails 38 and 40 and a right shuttle block 114 is located intermediate the right pair of rails 42 and 44. As best seen in FIG. 1, the shuttle blocks 112, 114 are identical rectangular shaped blocks, each having beveled vertical cam follower edges. Specifically, the shuttle block 112 has beveled vertical inboard and outboard edges 116 and 118, respectively, while the shuttle block 114 has beveled vertical edges 120 and 122, respectively. Each of the shuttle blocks also define upper 124 and lower 126 end faces. The end faces 124 and 126 are vertically spaced so as to be slidably captured between their associated upper 127,127' and lower 128,128' opposed parallel bar portion interior planar edge areas shown in FIG. 4.

The operation of the shift rail lock-out mechanism of the present invention will now be described. The lock-out mechanism is a safeguard to prevent the transmission from being in more than one speed-gear at a time. That is, the interlock system "holds" three of the four sliding shift rails in neutral while the remaining shift rail is free to be shifted or is in a gear engaging position. As seen in FIGS. 3 and 4, for example, all the shift rail cam recesses 50, 52, 54 and 56 are aligned in a common transverse plane defined by the interlock frame member 62, 64. The four shift rails 38, 40, 42 and 44 are positively located in their neutral positions as by spring loaded plungers for example, (not shown), which are described in the '729 patent.

It will be noted in FIG. 4 that the upper and lower beveled edges 102 and 104 provide a pair of coplanar left stop shoulders 130 and 132, respectively. In a similar manner the upper and lower beveled edges 108 and 110 provide a pair of coplanar right stop shoulders 134 and 136, respectively. The stop shoulders are operative to contact their associated shuttle block outer beveled edges and thereby position the shuttle blocks at predetermined locations relative to their associated pair of rails in a manner to be described.

Figures 7, 8:
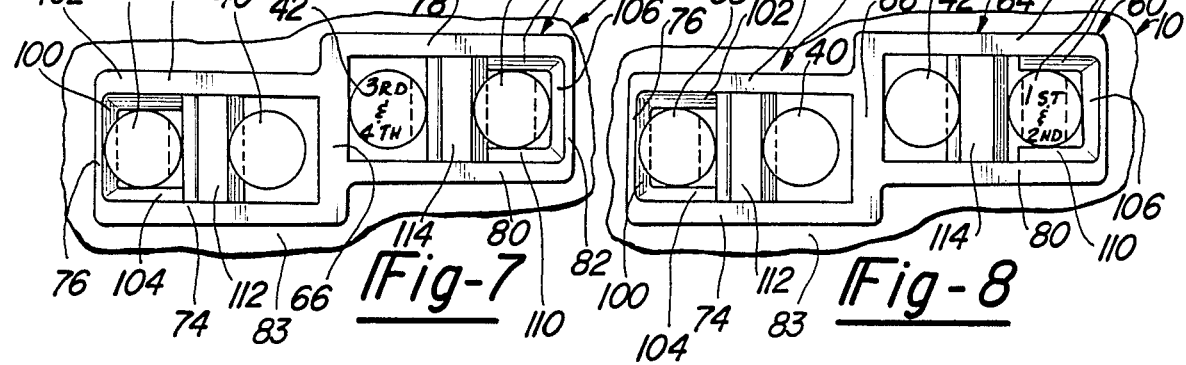

FIG. 7 shows the left inboard or fifth speed rail 40 in neutral prior to its being shifted axially wherein its outwardly facing recess 52 is initially interlocked with the left shuttle block inner beveled edge 118. In this position, the left shuttle block outer beveled edge 116 is shown in contact with its associated left pair of stop shoulders 130 and 132. Upon the left inboard rail 40 being shifted its outwardly facing recess 52 cams the left shuttle block 112 leftwardly a predetermined distance. As a result the left shuttle block inner beveled edge 118 is unlocked from the recess 52 and its outer beveled edge 116 is moved into locking engagement with the left outboard or reverse rail inwardly facing recess 50. At the time the left shuttle block outer beveled edge 116 moves the frame member 62, 64 leftwardly because it is in contact with the frame member left stop shoulders 130 and 132. Such movement results in the frame member left bar portion interior beveled edge 100 being moved out of locking engagement with the left outboard reverse rail outwardly facing recess 50. At the same time the frame member right bar portion interior beveled edge 106 is moved into locking engagement with the right outboard or first/second shift rail 44 outwardly facing recess 54.

The above described sequences for rail 40 also applies for the shifting sequence of the right inboard or third/fourth speed rail 42 in a converse manner. This follows because of the symmetrical arrangement of the lock-out mechanism about the longitudinally extending vertically disposed plane of symmetry indicated at 53 in FIG. 3.

FIG. 7 shows the left outboard or reverse rail 38 in neutral prior to being shifted axially wherein its outwardly facing recess 50 is initially interlocked with the frame member left bar portion internal beveled edge 100. Also, the left shuttle block inner beveled edge 118 is initially interlocked with the left inboard or fifth rail outwardly facing recess 52 together with the left shuttle block outer beveled edge 116 being in engagement with its associated left pair of stop shoulders 130 and 132. Further, the right shuttle block outer beveled edge 122 is in locking engagement with the right outboard or first/second speed rail inwardly facing recess 54 while its outer beveled edge 122 also contacts the right stop shoulders 134 and 136.

Upon the left outboard reverse rail being shifted, its outwardly facing recess cams the frame member 62, 64 leftwardly a predetermined distance until the frame member left bar portion interior beveled edge 100 is unlocked from the left outboard reverse rail outwardly facing recess 50. At the same time, the frame member right portion interior beveled edge 106 is moved into locking engagement with the right outboard first/second speed rail 44 outwardly facing recess 54. Further, during this time the right shuttle block inner beveled edge 120 is moved into locking engagement with the right inboard third/fourth speed rail outwardly facing recess 56.

The above described sequence for the left outboard reverse speed rail 38 also applies for the shifting sequence of the right outboard first/second speed rail 44 in a converse manner. Again, this is true because of the symmetrical arrangement of the lock-out mechanism about the symmetrical medial plane 53.

FIG. 9 shows a modified form of the invention wherein the shift rails 38', 40', 44' and 44' have their principal axis located in a common horizontal plane 34'. Further, the frame member 140 defines a single rectangular shaped opening 142 through which all four rails extend. The operation of the lock-out mechanism 140 in all respects is identical to that of the mechanism 60. It will further be appreciated that a lock-out mechanism could be provided for either the left or right pair of shift rails. In such an arrangement both the inboard and outboard rails would be formed with a pair of opposed recesses.

Although only two embodiments of the invention have been disclosed, it is apparent that other embodiments and modifications of the invention are possible.

What is claimed is:

1. A lock-out mechanism for a left and right pair of longitudinally extending mirror image shift rails of a change speed gear transmission, said transmission comprising case means having a transversely oriented vertically extending first planar wall surface portion, said case means formed with a left and right pair of equal diameter through bores with each bore having an end terminating in said wall surface portion, said bores arranged such that said left pair of bores having their axes lying in a first plane and said right pair of bores having their axes lying in a second plane wherein said first and second planes are each extending horizontally, each said left and a right pair of rails defining an inboard rail and an outboard rail sized to extend through an associated pair of said bores for individual reciprocal axial travel therein; said lock-out mechanism comprising:

an lock-out frame member having upper and lower substantially horizontally disposed bar portions joined by left and right bar portions disposed normally to said upper and lower bar portions, said frame member forming a generally rectangular shaped opening defined in part by opposed interior edge areas of said upper and lower bar portions;

said frame member positioned with its one side in flush relation with said first wall surface portion such that said left and right pairs of rails extend through said frame member opening and wherein said frame member is supported on at least one rail of said pair of rails for transverse movement relative to said pair of rails;

said case means including a second planar wall surface portion supported in spaced parallel relation with said first wall surface portion in juxtaposition with the other side of said frame member whereby said frame member is free to slid transversely relative to said first and second wall surface portions, each said pair of rails having its outboard rail formed with a pair of oppositely facing recesses and its inboard rail formed with an outwardly facing recess, each of said recess adapted to lie in a common transverse plane which includes said frame member with said left and right pair of rails in their neutral mode, a pair of left and right identical rectangular shaped shuttle blocks, each said shuttle block defining an inner and outer vertically extending beveled edge, each said shuttle block also defining upper and lower horizontally disposed end faces vertically spaced so as to be slidably captured between said frame member opposed interior edge areas;

said left shuttle block located between said left pair of rails and said right shuttle block located between said right pair of rails whereby each said shuttle block is adapted to slide on said frame member interior edge areas a predetermined transverse distance relative to its associated pair of rails;

said frame member left and right bar portions each having an internal beveled edge arranged such that with one of said frame member internal beveled edges in locked engagement with its associated outboard rail outwardly facing recess the other one of said frame member internal beveled edges being in unlocked relation with its associated outboard rail outwardly facing recess;

said frame member including left and right stop means thereon, each said left and right stop means adapted to contact a respective left and right shuttle block outer beveled edge with each said stop means associated outboard rail having its outwardly facing recess locking engaging its opposed frame member internal beveled edge, whereby upon said left inboard rail being shifted axially from its neutral position with its outwardly facing recess initially interlocked with said left shuttle block inner beveled edge, and said left shuttle block outer beveled edge contacting its associated left stop means, said left inboard rail shifting movement causing its outwardly facing recess to cam said left shuttle block leftwardly a predetermined distance such that said left shuttle block inner beveled edge is unlocked from said left inboard rail outwardly facing recess and its outer beveled edge is moved into locking engagement with said left outboard rail inwardly facing recess, and coincident therewith said left shuttle block outer beveled edge moving said frame member leftwardly by virtue of its contact with said frame member left stop means, resulting in said frame member left interior beveled edge being moved out of locking engagement with said left outboard rail outwardly facing recess and said right bar portion interior beveled edge being moved into locking engagement with said right outboard rail outwardly facing recess, and conversely upon said right inboard rail being shifted axially from its neutral position;

and whereby upon said left outboard rail being shifted axially from its neutral position with its outwardly facing recess initially interlocked with said frame member left bar portion internal beveled edge and said left shuttle block inner beveled edge initially interlocked with said left inboard rail outwardly facing recess together with said left shuttle block outer beveled edge in engagement with its associated left stop means, and said right shuttle block outer beveled edge in locking engagement with said right outboard rail inwardly facing recess while also contacting its associated right stop means, said left outboard rail shifting movement causing its outwardly facing recess to cam said frame member leftwardly a predetermined distance such that said frame member left bar portion interior beveled edge is unlocked from said left outboard rail outwardly facing recess and its right bar portion interior beveled edge is moved into locking engagement with said right outboard rail outwardly facing recess, and whereby said right shuttle block right beveled edge is moved into locking engagement with said right inboard rail outwardly facing recess, and conversely upon said right outboard rail being shifted axially from its neutral position.

2. The lock-out mechanism as set forth in claim 1, wherein said left and right stop means are in the form of left and right pairs of coplanar stop shoulders extending normal to their associated opposed interior edge areas.

3. The lock-out mechanism as set forth in claim 1, wherein said frame member in the form of left and right generally rectangular-shaped offset frames interconnected by an intermediate column common to both said left and right frames, said left and right frames each defining a left and right rectangular-shaped opening, and wherein said left pair of rails extend through said left opening and said right pair of rails extend through said right opening.

* * * * *